United States Patent [19]
Jewitt et al.

[11] 4,301,687
[45] Nov. 24, 1981

[54] PNEUMATIC TENSION SENSOR

[75] Inventors: James W. Jewitt, King of Prussia; Ross W. Johnston, Norristown, both of Pa.; Sanford Platter, Boulder, Colo.

[73] Assignee: Computer Peripherals, Inc., Minneapolis, Minn.

[21] Appl. No.: 151,496

[22] Filed: May 19, 1980

[51] Int. Cl.³ .............................................. G01L 5/08
[52] U.S. Cl. .................................................. 73/862.45
[58] Field of Search ............................ 73/144, 37.7; 242/75.43

[56] References Cited
U.S. PATENT DOCUMENTS 3,312,415  4/1967  Jeans ................................. 242/75.43
3,677,078  7/1972  Larmurier ........................ 73/141 R
3,861,207  1/1975  Barbee ................................. 73/144
3,868,851  3/1975  Breyer ................................. 73/144

FOREIGN PATENT DOCUMENTS 2548172  5/1976  Fed. Rep. of Germany ........ 73/143

Primary Examiner—Charles A. Ruehl
Attorney, Agent, or Firm—Robert M. Angus; Joseph A. Genovese

[57] ABSTRACT

A tension sensor is placed within a fluid bearing supporting a flexible tape at least partially wrapped around the periphery thereof. The bearing includes a source of pressurized fluid, such as air, and a plurality of metered orifii for admitting fluid into the region of the periphery to support the tape on a fluid bearing. The sensor includes a chamber and at least two metered orifice means, one in communication with the region of pressurized fluid supporting the tape and the other in communication with the source of pressurized fluid. A pressure sensor senses the pressure within the chamber, the pressure being directly proportional to the tension in the tape.

3 Claims, 4 Drawing Figures

PNEUMATIC TENSION SENSOR

This invention relates to a pneumatic tension sensor, and particularly to a tension sensor for sensing the tension in a flexible tape, for example in magnetic tape trained through the tape path of a tape transport.

It is well known to provide air bearings for supporting the tape in a magnetic tape unit, particularly of the class utilized in computer applications. Such bearings ordinarily supply fluid pressure from internal cavity within the bearing through metered orifice means to the external surface of the bearing where it is trapped between the periphery of the bearing and the tape trained around the bearing. It can be shown that the pressure of the fluid within the region trapped between the tape and the bearing surface is directly proportional to the tension in the tape.

Previous attempts have been made to utilize the air pressure to sense or determine the tension in the tape, but such attempts have not been altogether successful. It is known, for example, to employ a pressure sensor in direct communication with the region between the tape and the periphery of the sensor to sense the pressure in that region, and hence the tension in the tape. See, for example, British Pat. No. 946,343 published Jan. 8, 1964. However, in the event of complete collapse of the tape (such as if extremely high tension in the tape caused the tape to contact the sensor), the tape closed the orifice of the sensor so that the sensor would sense no pressure, a condition usually associated with little or no tension in the tape. As a result, control apparatus controlled by the sensor attempted to further increase the tension in the tape, often causing damage to the tape. In U.S. Pat. No. 3,845,434, a resilient field bearing uas utilized which would collapse upon increase in tape tension, or pressure between the tape and the bearing surface. Seemingly, the arrangement described in U.S. Pat. No. 3,845,434 would not encounter the same false reading as might occur the previously described system, but in reality the degree of deformation of the sensor was not sufficient to give accurate readings over a wide range of tension, nor was it immune from the difficulties rising from high tension in the tape.

Accordingly, it is an object to the present invention to provide a pneumatic sensor for sensing the tension in the flexible tape over a full range, to and including complete closure of the tape against the surface of the bearing.

In accordance with the present invention, an air bearing includes a plurality of orifice means for supplying fluid bearing pressure against a flexible tape trained around the bearing. A pressure sensor, disposed within a separate chamber inside the bearing is in fluid communication with both the pressure chamber within the bearing and the region of the bearing surface supporting the tape under fluid pressure. The fluid communication between the pressure sensor cavity and the pressure chamber is metered in such a way that the pressure within the pressure sensor cavity is ordinarily at a pressure between that within the pressure chamber and that supporting the tape. In the event of complete closure of the metering orifice to the region of the pressure supporting the tape, the pressure within the sensor cavity rises to that within the pressure chamber to thereby indicate extremely high tension, as would be the case. Consequently, controls associated with the tension sensor would not inadvertently react to further increase the tension as would be the case in prior sensors.

One feature of the present invention resides in the provision of a grounding cavity, surrounding the orifice between the sensor cavity and the region of pressure supporting the tape.

The above and other features of this invention will be more fully understood from the following detailed description and the accompanying drawings, in which.

Figure 1:
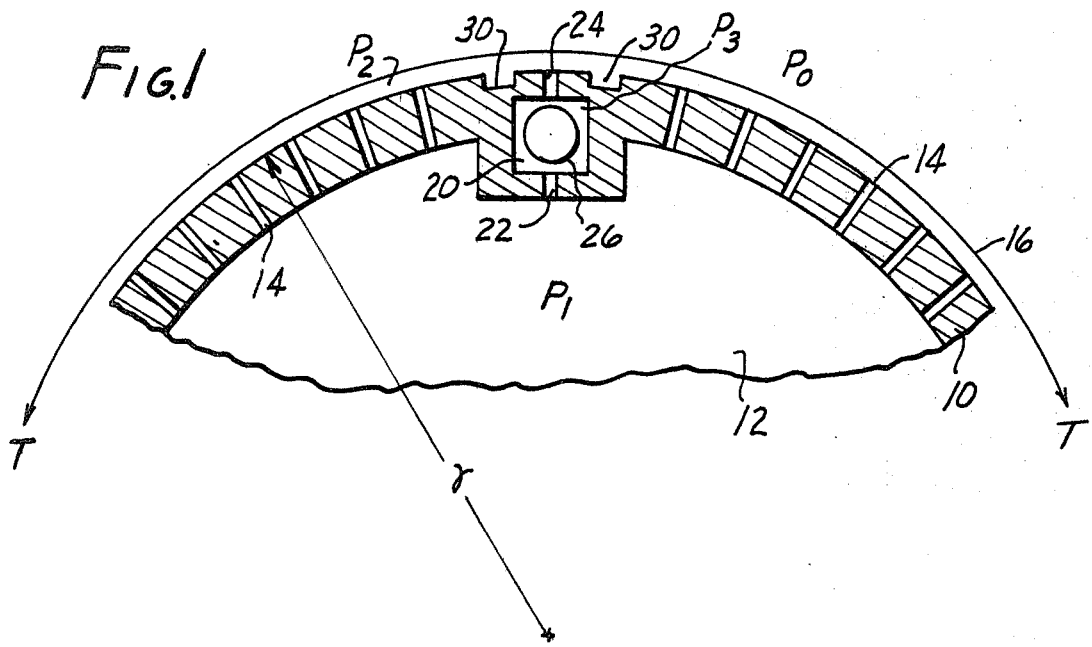
FIG. 1 is a section view of a portion of a fluid bearing containing the tension sensor in accordance with the presently preferred embodiment of the present invention.
Figure 2:
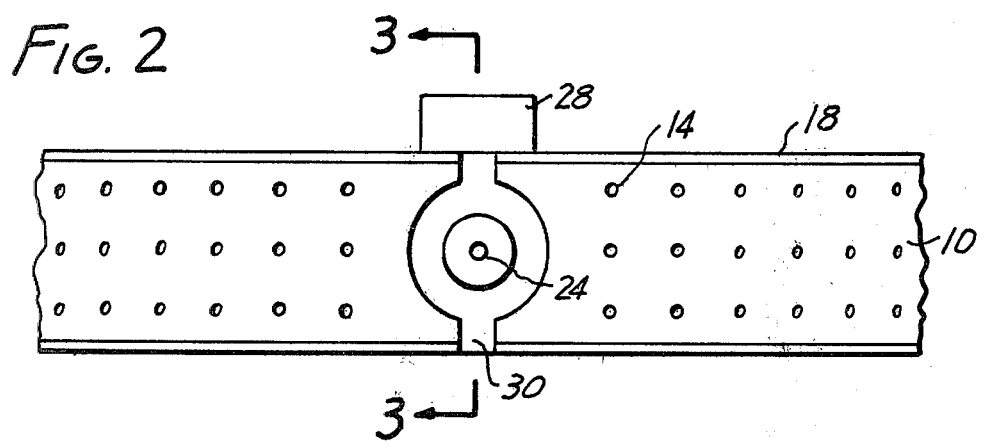
FIG. 2 is a partial top view of the apparatus illustrated in FIG. 1.
Figures 3, 4:
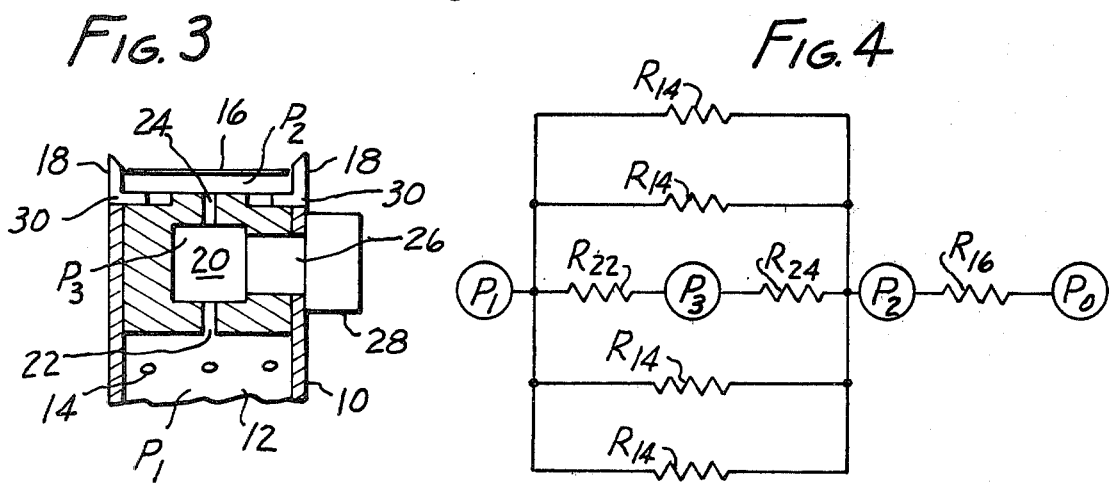
FIG. 3 is a sectional view taken along line 3—3 in FIG. 2.
FIG. 4 is a schematic representation of the pneumatic circuit of the fluid bearing illustrated in FIG. 1.

Referring to the drawings, and particularly to FIGS. 1-3, there is illustrated a fluid bearing in accordance with the presently preferred embodiment of the present invention. The fluid bearing 10 includes a chamber 12 containing fluid, such as air, under pressure at pressure P1. A plurality of orifice means 14 provide metered fluid communication between chamber 12 and the external surface of bearing 10 to thereby provide fluid at a pressure P2 to support tape 16. As shown, tape 16 is under tension and trained around the periphery of the bearing to be supportive thereby. Conveniently, and is shown particularly in FIGS. 2 and 3, flanges 18 may extend upwardly from the peripheral surface of bearing 10 to guide tape 16 and to completely enclose the cavity containing the fluid under pressure P2.

A cavity 20 is in fluid communication with chamber 12 through metered orifice 22 and is in fluid communication with the region of the periphery of bearing 10 through metered orifice 24. Cavity 20 is also in fluid communication through opening 26 to pressure transducer 28 which may be connected to suitable control mechanisms (not shown) to control the speeds of motors controlling the supply and take-up reels of a tape transport to thereby control the tension within the tape.

If desired, an optional grounding slot 30 may be provided surrounding orifice 24 to isolate orifice 24 and the pressure sensor from the direct effects of pressure beneath the tape from orifice means 14.

With reference to FIG. 4, the operation of the tension sensor may be explained. The schematic diagram illustrated in FIG. 4 is based on the assumption that no grounding slot 30 is present. Fluid pressure P1 within chamber 12 flows through the plurality of orifice means 14 to create the fluid pressure P2 beneath tape 16. Thus, a pressure drop, schematically represented across flow resistance R14, is translated in parallel through the plurality of orifice means 14. A further pressure drop to the atmospheric pressure P0 occurs across the edges of tape 16 and is schematically represented across flow resistance R16. In parallel with the metering orifice means 14 is orifice 22 to cavity 20 in series with metering orifice 24 between cavity 20 and the external portions of the bearing. These are graphically illustrated at flow resistance R22 and R24 in FIG. 4. Since the flow resistance of metering orifice means 22 and 24 are known, the pressure P3 in cavity 20 is a known fraction of the difference between the pressure P1 and P2. Since the pressure P1 is known from the regulated supply, the pressure P3 in cavity 20 is representative of the pressure P2 supporting the tape.

It can be shown that the tension T within the tape 16 is directly proportional to the pressure P2 supporting the tape and the radius r of the fluid bearing, as by the following relationship:

$$T = rP2 \tag{1}$$

where T is the tension in the tape in pounds per inch, P2 is the pressure supporting the tape in pounds per square inch and r is the radius of the bearing in inches. It can also be shown that:

$$P2 = \frac{P3(R22 + R244) - P1\, R24}{R22} \tag{2}$$

where R22 and R24 are the flow resistances of orifice means 22 and 24, respectively. Therefore, the tension in the tape may be determined from the relationship:

$$T = r\frac{P3(R22 + R24) - P1\, R24}{R22} \tag{3}$$

Since pressures P1 and P3 are known from measurement, and R22, R24 and r are known from the geometry of the system, the tension T in tape 16 may be determined from suitable look-up tables or the like, or through the aid of a microprocessor.

In the event that the tension in the tape increases to such an amount as to completely close the orifice means 14 and 24, the pressure transducer 28 will not be cut off from sensing the tension in the tape. Instead, the pressure within cavity 20 will rise to pressure P1 by virtue of the fluid communication through metering orifice 22 to thereby indicate a maximum pressure on the pressure sensor to indicate to the control mechanism that there is an exceedingly high tension in the tape. Consequently, unlike prior tension sensors, the tension sensor in accordance with the present invention will not give a false reading upon closure of the orifice to the region of fluid pressure supporting the tape.

The present invention thus provides a tension sensor which is simple and reliable in operation and inexpensive to incorporate in tape transports.

This invention is not to be limited by the embodiment shown in the drawings and described in the description, which is given by way of example and not of limitation, but only in accordance with the scope of the appended claims.

What is claimed is:

1. In a fluid bearing having a source of pressurized fluid and a plurality of metered orifice means in fluid communication between said source and the periphery of said bearing to form a fluid bearing for supporting a flexible tape under tension, a tension sensor comprising: a chamber within said bearing; pressure sensing means for sensing the pressure of fluid within said chamber; first metered orifice means providing fluid communication between said chamber and the periphery of said bearing; and second metered orifice means providing fluid communication between said chamber and said source of pressurized fluid.

2. A tension sensor for sensing the tension in a flexible tape comprising: fluid bearing means having said tape wrapped at least partially around the periphery thereof; a source of pressurized fluid within said bearing means; a plurality of metered orifice means in fluid communication between said source of pressurized fluid and the periphery of said bearing means in the region where said tape is wrapped, said plurality of orifice means admitting fluid into said region to support said tape; a chamber within said bearing; first metered orifice means providing fluid communication between said chamber and the periphery of said bearing means in said region; second metered orifice means providing fluid communication between said chamber and said source of pressurized fluid; and pressure sensing means for sensing the pressure of fluid within said chamber.

3. Apparatus according to either claim 1 or 2 further including grounding slot means in the periphery of said bearing means surrounding said first orifice means, said grounding slot means being open to the atmosphere to isolate said first orifice means from said plurality of orifice means.

* * * * *